(12) United States Patent
Lee et al.

(10) Patent No.: US 11,196,869 B2
(45) Date of Patent: Dec. 7, 2021

(54) FACILITATION OF TWO OR MORE VIDEO CONFERENCES CONCURRENTLY

(71) Applicant: Lenovo (Singapore) Pte. Ltd., Singapore (SG)

(72) Inventors: Jonathan Co Lee, Cary, NC (US); Russell Speight VanBlon, Raleigh, NC (US); Philip Lee Childs, Fort Wayne, IN (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 64 days.

(21) Appl. No.: 16/792,209

(22) Filed: Feb. 15, 2020

(65) Prior Publication Data
US 2021/0258427 A1 Aug. 19, 2021

(51) Int. Cl.
*H04M 3/42* (2006.01)
*H04M 3/56* (2006.01)
*G06F 3/16* (2006.01)
*H04L 12/18* (2006.01)

(52) U.S. Cl.
CPC ............ *H04M 3/568* (2013.01); *G06F 3/165* (2013.01); *H04L 12/1818* (2013.01); *H04L 12/1831* (2013.01)

(58) Field of Classification Search
CPC .... H04M 3/568; G06F 3/165; H04L 12/1818; H04L 12/1831
USPC ........... 379/202.01, 158; 709/204; 348/14.03
See application file for complete search history.

(56) References Cited

U.S. PATENT DOCUMENTS

| | | | | |
|---|---|---|---|---|
| 5,195,086 A | * | 3/1993 | Baumgartner | H04L 12/1813 370/264 |
| 6,075,571 A | | 6/2000 | Kuthyar et al. | |
| 6,138,144 A | * | 10/2000 | DeSimone | H04L 12/18 709/204 |
| 6,584,077 B1 | | 6/2003 | Polomski | |
| 7,362,349 B2 | | 4/2008 | Nelson et al. | |
| 7,412,392 B1 | * | 8/2008 | Satapathy | H04L 12/1831 370/260 |
| 7,499,075 B2 | | 3/2009 | Miceli | |
| 7,558,221 B2 | | 7/2009 | Nelson et al. | |

(Continued)

OTHER PUBLICATIONS

"About Pidgin", Pidgin, retrieved from https://pidgin.im/about/.
(Continued)

*Primary Examiner* — William J Deane, Jr.
(74) *Attorney, Agent, or Firm* — John M. Rogitz; John L. Rogitz

(57) ABSTRACT

In one aspect, a first device includes a processor, a microphone accessible to the processor, a speaker accessible to the processor, a display accessible to the processor, and storage accessible to the processor. The storage may include instructions executable by the processor to facilitate concurrent video conferencing for first and second video conferences and to receive user input selecting the first video conference. Based on the user input, the instructions may be executable to control the speaker to output audio for the first video conference at a greater volume level than audio for the second video conference and to transmit input from the microphone to a second device associated with a participant of the first video conference but not to a third device associated with a participant of the second video conference.

20 Claims, 5 Drawing Sheets

(56) References Cited

U.S. PATENT DOCUMENTS

| | | | |
|---|---|---|---|
| 9,013,539 B1 | 4/2015 | Fulay et al. | |
| 9,113,032 B1 | 8/2015 | Mey et al. | |
| 9,143,729 B2 | 9/2015 | Anand et al. | |
| 9,420,108 B1* | 8/2016 | Bostick | H04L 65/403 |
| 9,781,385 B2 | 10/2017 | Ma et al. | |
| 10,348,777 B2 | 7/2019 | Knotts | |
| 2003/0105820 A1* | 6/2003 | Haims | G06Q 10/10 |
| | | | 709/205 |
| 2005/0264648 A1 | 12/2005 | Ivashin et al. | |
| 2006/0164508 A1* | 7/2006 | Eshkoli | H04N 7/148 |
| | | | 348/14.09 |
| 2006/0184624 A1* | 8/2006 | Thukral | H04N 7/173 |
| | | | 709/204 |
| 2007/0121530 A1* | 5/2007 | Vadlakonda | H04L 12/1827 |
| | | | 370/260 |
| 2009/0089683 A1* | 4/2009 | Thapa | H04N 7/15 |
| | | | 715/756 |
| 2009/0216835 A1* | 8/2009 | Jain | G06Q 10/10 |
| | | | 709/204 |
| 2011/0271210 A1 | 11/2011 | Jones et al. | |
| 2011/0279634 A1 | 11/2011 | Periyannan et al. | |
| 2011/0279635 A1 | 11/2011 | Periyannan et al. | |
| 2012/0062442 A1 | 3/2012 | Locker et al. | |
| 2012/0327175 A1 | 12/2012 | Couse | |
| 2014/0192141 A1* | 7/2014 | Begeja | H04N 7/15 |
| | | | 348/14.08 |
| 2014/0267571 A1 | 9/2014 | Periyannan et al. | |
| 2014/0267576 A1 | 9/2014 | Hiller et al. | |
| 2014/0313278 A1* | 10/2014 | Periyannan | H04L 65/403 |
| | | | 348/14.08 |
| 2015/0022625 A1* | 1/2015 | Thapa | H04L 65/4038 |
| | | | 348/14.08 |
| 2016/0099986 A1 | 4/2016 | Bentley et al. | |
| 2018/0101460 A1* | 4/2018 | Mikkonen | A61B 1/0676 |
| 2018/0101760 A1 | 4/2018 | Nelson et al. | |
| 2018/0176639 A1* | 6/2018 | Sprenger | H04N 21/4396 |
| 2018/0337968 A1* | 11/2018 | Faulkner | H04L 12/1813 |
| 2019/0124128 A1 | 4/2019 | Bader-Natal et al. | |
| 2019/0166330 A1 | 5/2019 | Ma et al. | |
| 2019/0215347 A1* | 7/2019 | Liau | H04M 3/56 |
| 2020/0411038 A1* | 12/2020 | Reynolds | G11B 27/19 |

OTHER PUBLICATIONS

"Natural Language Processing", Wikipedia, retrieved on Oct. 27, 2020 from https://en.wikipedia.org/wiki/Natural_language_processing.

"Sentiment analysis", Wikipedia, retrieved on Oct. 27, 2020, from https://en.wikipedia.org/wiki/Sentiment_analysis.

"Speech segmentation", Wikipedia, retrieved on Oct. 27, 2020 from https://en.wikipedia.org/wiki/Speech_segmentation.

"Text segmentation", Wikipedia, retrieved on Oct. 27, 2020 from https://en.wikipedia.org/wiki/Text_segmentation.

Christensen et al., "Graphical User Interfaces for Grouping Video Conference Participants", file history of related U.S. Appl. No. 17/119,225, filed Dec. 11, 2020.

Christensen et al., "Graphical User Interfaces for Monitoring Video Conferences", file history of related U.S. Appl. No. 17/119,060, filed Dec. 11, 2020.

VanBlon et al., "Systems and Methods to Merge Data Streams from Different Conferencing Platforms", file history of related U.S. Appl. No. 16/370,207, filed Mar. 29, 2019.

* cited by examiner

FACILITATION OF TWO OR MORE VIDEO CONFERENCES CONCURRENTLY

FIELD

The present application relates to technically inventive, non-routine solutions that are necessarily rooted in computer technology and that produce concrete technical improvements.

BACKGROUND

There might be times when a person is requested to participate in multiple video conferences at the same time. However, as recognized herein it is not currently possible, technologically speaking, for the person to adequately participate in each of the video conferences at the same time using current video conferencing systems. Thus, the person must simply decide to participate in only one conference and skip the other conference(s) due to the time conflict. There are currently no adequate solutions to the foregoing computer-related, technological problem.

SUMMARY

Accordingly, in one aspect a first device includes at least one processor, at least one microphone accessible to the at least one processor, at least one speaker accessible to the at least one processor, at least one display accessible to the at least one processor, and storage accessible to the at least one processor. The storage includes instructions executable by the at least one processor to facilitate concurrent video conferencing for first and second video conferences, where the first and second video conferences are different from each other. The instructions are also executable to receive user input selecting the first video conference and then, based on the user input, control the at least one speaker to output audio for the first video conference at a greater volume level than audio for the second video conference. The instructions are also executable to, based on the user input, transmit input from the at least one microphone to a second device associated with a participant of the first video conference but not to a third device associated with a participant of the second video conference.

In some examples, the instructions may be executable to concurrently present visual information on the at least one display related to both the first and second conferences while controlling the at least one speaker to output the audio for the first video conference at the greater volume level and while transmitting the input from the at least one microphone to the second device but not to the third device. The visual information may include one or more video feeds of other participants of the first and second video conferences, and/or one or more electronic documents being shared between participants of the first and second video conferences.

Also in some examples, the instructions may be executable to, based on the user input, control the at least one speaker to output audio for the first video conference at a volume level greater than zero and decline to output audio for the second video conference at a volume level greater than zero. If desired, in these examples and based on the user input, the instructions may be executable to control the at least one speaker to output audio for the first video conference at a volume level greater than zero and present text determined from audio for the second video conference on the at least one display.

Additionally, in some implementations the instructions may be executable to, based on the user input, control the at least one speaker to output audio for the first video conference at a first volume level greater than zero and output audio for the second video conference at a second volume level greater than zero but less than the first volume level.

For example, the at least one speaker may include at least first and second speakers and the instructions may be executable to, based on the user input, control both the first and second speakers to output audio for the first video conference at the first volume level and to control one but not both of the first and second speakers to output audio for the second video conference at the second volume level.

Furthermore, in some examples the instructions may be executable to, while controlling the at least one speaker to output audio for the first video conference at a greater volume level than audio for the second video conference, present a notification at the first device indicating that a predefined keyword has been spoken in the second video conference. In some embodiments, the keyword may be defined by a participant of the second video conference prior to the keyword being spoken in the second video conference. Also in some embodiments, the instructions may be executable to present a selector on the display as part of the notification, where the selector may be selectable to switch to transmitting input from the at least one microphone to the third device associated with a participant of the second video conference but not to the second device associated with a participant of the first video conference.

Still further, in some implementations the instructions may be executable to, based on the user input, transmit an indication to the second device indicating that the at least one microphone is not being currently used to participate in the second video conference.

Also in some implementations, the instructions may be executable to present, on the display, an indication regarding whether the second device is currently streaming microphone input for presentation as part of the first video conference.

In another aspect, a method includes concurrently presenting, at a first device, data related to first and second video conferences that are currently ongoing, with the first and second video conferences being different from each other. The method also includes receiving user input selecting the first video conference and, based on the user input, controlling at least one speaker accessible to the first device to output audio for the first video conference at a first volume level. Also based on the user input, the method includes transmitting input from at least one microphone accessible to the first device to a second device associated with a participant of the first video conference but not to a third device associated with a participant of the second video conference.

In some examples, the method may also include, based on the user input and concurrent with controlling the at least one speaker to output audio for the first video conference at the first volume level, controlling the at least one speaker to output audio for the second video conference at a second volume level that is more than zero but that is less than the first volume level.

Also in some examples, the method may include, based on the user input and concurrent with controlling the at least one speaker to output audio for the first video conference at the first volume level, declining to output audio for the second video conference at a second volume level that is more than zero but still presenting text on a display accessible to the first device. The text may correspond to spoken words identified from audio for the second video conference.

Additionally, in some implementations the at least one speaker may include a left ear speaker and a right ear speaker different from the left ear speaker. In these implementations, the method may then include, based on the user input, controlling both the left ear and right ear speakers to output audio for the first video conference at the first volume level and controlling one but not both of the left ear and right ear speakers to output audio for the second video conference at a second volume level that is more than zero but that is less than the first volume level.

Still further, in some examples the method may include, while controlling the at least one speaker to output audio for the first video conference, presenting a visual notification that indicates that a predefined keyword has been spoken in the second video conference. The method may also include presenting a visual indication regarding whether the second device is currently streaming microphone input from the second device as part of the first video conference.

In still another aspect, at least one computer readable storage medium (CRSM) that is not a transitory signal may include instructions executable by at least one processor of a first device to facilitate a first video conference with at least a second device. The instructions may also be executable to, while facilitating the first video conference with at least the second device, present at least one visual indication on a display accessible to the at least one processor. The visual indication may indicate whether the second device is currently streaming microphone input to the first device as part of the first video conference and/or presenting audio at the second device as part of the first video conference but not streaming microphone input to the first device as part of the first video conference.

In some implementations, the instructions may also be executable to, based on user input received via the first device, transmit an indication to the second device indicating that at least one microphone accessible to the at least one processor is not being currently used to provide audio for the first video conference to the second device, and/or that at least one speaker accessible to the at least one processor is not being currently used to present audio at the first device for the first video conference.

The details of present principles, both as to their structure and operation, can best be understood in reference to the accompanying drawings, in which like reference numerals refer to like parts, and in which:

DETAILED DESCRIPTION

Figure 1:
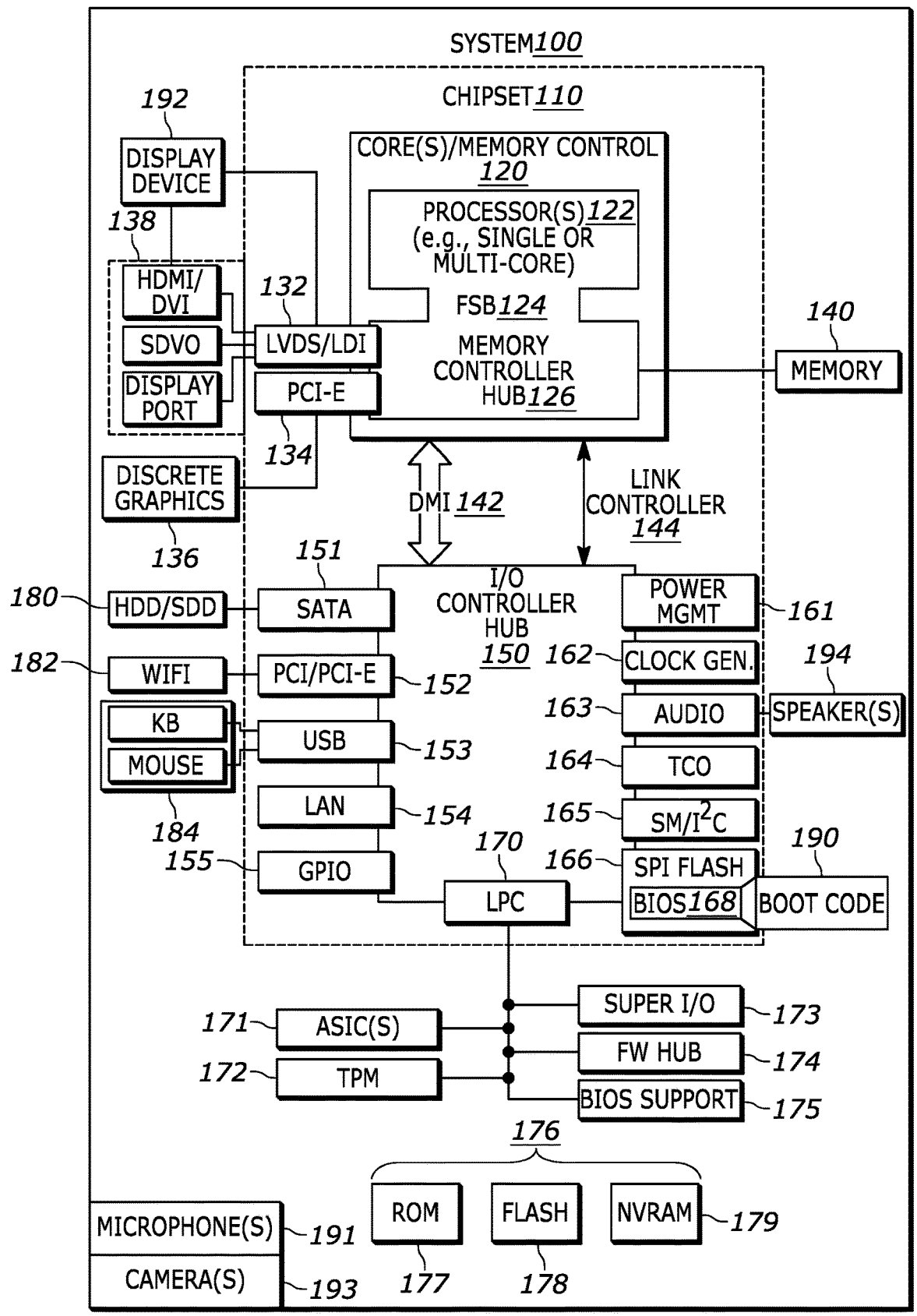
FIG. 1 is a block diagram of an example system consistent with present principles.

Among other things, the present application is directed to unified communications (UC) solutions, e.g., video conferencing. The present application discloses systems and methods for a person to join and participate in multiple UC meetings simultaneously using various technologies and applications as indicated in a meeting viewer. Thus, for example, conferences that might be facilitated using two different conferencing services and associated software applications may be integrated into a single meeting viewer, though the meeting viewer may also be used where multiple conferences are being facilitated using the same conferencing service and associated application. Also, note that while much of the disclosure below discusses two video conferences that might occur simultaneously, present principles may apply to situations in which three or more meetings are to be participated in simultaneously.

In any case, within the meeting viewer there may be an active window showing the meeting that a person is actively participating in. Active may include full audio and microphone control as well as the ability to see the shared content and participant videos. Then in another window, adjacent or floating, a passively-attended meeting may be presented. In this passive window, the person can see the content of the passive meeting and livefeed videos of the participants of the passive meeting while presentation of meeting audio and transmission of microphone input may vary. However, also note that presentation of videos of the other passive meeting participants may also vary in that video for the other participants may be paused and instead still images may be presented when the meeting is passive.

In one example, the device may allow the user to hear audio from both active and passive meetings simultaneously, with a passive meeting being microphone-muted and the microphone being active for the active meeting. However, in other examples the microphone may be muted for both active and passive meetings and the user may be given the option to converse in either meeting by enabling microphone control for that meeting. Once the microphone is enabled for one meeting, the other meeting may be automatically microphone-muted and the device may even stop/pause transmitting video showing the user from its camera to the other participants of this now-passive meeting. Thus, in some examples video may be tied to microphone activity in that both microphone input and video of the user may not be transmitted to the devices of other participants of a passive meeting. Then when the user switches that meeting back to active with the microphone active for that meeting, video showing the user may again be transmitted to the other participants, pending e.g. exceptions or optional user settings indicating otherwise.

Also in some example implementations, the user may be able to hear the audio for both active and passive meetings, but the passive meeting may be set at a lower decibel level or lower volume as may be customized by the user. If the user switches active meetings, then the audio may also dynamically switch and microphone control may also switch to the now-active meeting. In some examples, stereo audio may be used where an active meeting may be heard in both ears via a headset with left and right ear speakers while the other, passive meeting may have its audio presented at a lower volume level and only in the left ear or right ear as may be configured by the user (e.g., volume level eight for active meeting, volume level three for passive meeting, on a scale from zero to ten). In other examples, audio for an active meeting may be presented to only one ear and audio for the passive meeting(s) may only be presented to the other ear, but with the audio for the active meeting being presented louder than audio for the passive meeting(s).

Still further, in some example implementations the device may present audio for the user to hear the active meeting and read live subtitles for the passive meeting. Thus, the microphone control may stay on the active meeting but the user may be provided with the ability to follow the context of the passive meeting by reading the subtitles. The subtitles may include a transcript of the last 30-60 seconds of the meeting so that a user may read the transcript to catch up at any point without having to say, "can you repeat that question?" or making another request.

Still further, the device may leverage speech recognition and/or intelligent taxonomy (e.g., an artificial intelligence model with an artificial neural network) so that when certain keywords of interest (e.g., a participant's name, a particular topic, a phrase like "are you there?") are spoken or mentioned during the passive meeting, then a pop-up dialog box or notification may be presented to the user to get his or her attention. The keyword may even be presented or highlighted with a different text color than other text within the pop-up dialog box (e.g., green text or yellow highlighting). The user may even be permitted to customize the keywords per meeting (e.g., potential profile setting) or globally.

Still further, attendees of a given meeting might want to know if someone else has joined multiple meetings. Thus, consistent with present principles a GUI indication may be presented that a given person is participating in multiple meetings at once and the GUI may even show whether the person is actively or passively participating in the current meeting. Additional buttons in the GUI may be presented to notify the person if his or her input is being requested. For example, a button next to a particular person's video feed may be pressed to send that person a chime or toast notification that their participation is requested for a certain topic. The toast notification may, e.g., be presented for only a threshold non-zero amount of time (e.g., five seconds) before disappearing.

What's more, consistent with present principles a meeting organizer may even be provided with the ability to not allow passively joined meetings via an option, or to allow for it, when initially setting up the meeting.

Prior to delving further into the details of the instant techniques, note with respect to any computer systems discussed herein that a system may include server and client components, connected over a network such that data may be exchanged between the client and server components. The client components may include one or more computing devices including televisions (e.g., smart TVs, Internet-enabled TVs), computers such as desktops, laptops and tablet computers, so-called convertible devices (e.g., having a tablet configuration and laptop configuration), and other mobile devices including smart phones. These client devices may employ, as non-limiting examples, operating systems from Apple Inc. of Cupertino Calif., Google Inc. of Mountain View, Calif., or Microsoft Corp. of Redmond, Wash. A Unix® or similar such as Linux® operating system may be used. These operating systems can execute one or more browsers such as a browser made by Microsoft or Google or Mozilla or another browser program that can access web pages and applications hosted by Internet servers over a network such as the Internet, a local intranet, or a virtual private network.

As used herein, instructions refer to computer-implemented steps for processing information in the system. Instructions can be implemented in software, firmware or hardware, or combinations thereof and include any type of programmed step undertaken by components of the system; hence, illustrative components, blocks, modules, circuits, and steps are sometimes set forth in terms of their functionality.

A processor may be any general purpose single- or multi-chip processor that can execute logic by means of various lines such as address lines, data lines, and control lines and registers and shift registers. Moreover, any logical blocks, modules, and circuits described herein can be implemented or performed with a general purpose processor, a digital signal processor (DSP), a field programmable gate array (FPGA) or other programmable logic device such as an application specific integrated circuit (ASIC), discrete gate or transistor logic, discrete hardware components, or any combination thereof designed to perform the functions described herein. A processor can also be implemented by a controller or state machine or a combination of computing devices. Thus, the methods herein may be implemented as software instructions executed by a processor, suitably configured application specific integrated circuits (ASIC) or field programmable gate array (FPGA) modules, or any other convenient manner as would be appreciated by those skilled in those art. Where employed, the software instructions may also be embodied in a non-transitory device that is being vended and/or provided that is not a transitory, propagating signal and/or a signal per se (such as a hard disk drive, CD ROM or Flash drive). The software code instructions may also be downloaded over the Internet. Accordingly, it is to be understood that although a software application for undertaking present principles may be vended with a device such as the system 100 described below, such an application may also be downloaded from a server to a device over a network such as the Internet.

Software modules and/or applications described by way of flow charts and/or user interfaces herein can include various sub-routines, procedures, etc. Without limiting the disclosure, logic stated to be executed by a particular module can be redistributed to other software modules and/or combined together in a single module and/or made available in a shareable library.

Logic when implemented in software, can be written in an appropriate language such as but not limited to C# or C++, and can be stored on or transmitted through a computer-readable storage medium (that is not a transitory, propagating signal per se) such as a random access memory (RAM), read-only memory (ROM), electrically erasable programmable read-only memory (EEPROM), compact disk read-only memory (CD-ROM) or other optical disk storage such as digital versatile disc (DVD), magnetic disk storage or other magnetic storage devices including removable thumb drives, etc.

In an example, a processor can access information over its input lines from data storage, such as the computer readable storage medium, and/or the processor can access information wirelessly from an Internet server by activating a wireless transceiver to send and receive data. Data typically is converted from analog signals to digital by circuitry between the antenna and the registers of the processor when being received and from digital to analog when being transmitted. The processor then processes the data through its shift registers to output calculated data on output lines, for presentation of the calculated data on the device.

Components included in one embodiment can be used in other embodiments in any appropriate combination. For example, any of the various components described herein and/or depicted in the Figures may be combined, interchanged or excluded from other embodiments.

"A system having at least one of A, B, and C" (likewise "a system having at least one of A, B, or C" and "a system having at least one of A, B, C") includes systems that have A alone, B alone, C alone, A and B together, A and C together, B and C together, and/or A, B, and C together, etc.

The term "circuit" or "circuitry" may be used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions.

Now specifically in reference to FIG. 1, an example block diagram of an information handling system and/or computer system 100 is shown that is understood to have a housing for the components described below. Note that in some embodiments the system 100 may be a desktop computer system, such as one of the ThinkCentre® or ThinkPad® series of personal computers sold by Lenovo (US) Inc. of Morrisville, N.C., or a workstation computer, such as the ThinkStation®, which are sold by Lenovo (US) Inc. of Morrisville, N.C.; however, as apparent from the description herein, a client device, a server or other machine in accordance with present principles may include other features or only some of the features of the system 100. Also, the system 100 may be, e.g., a game console such as XBOX®, and/or the system 100 may include a mobile communication device such as a mobile telephone, notebook computer, and/or other portable computerized device.

As shown in FIG. 1, the system 100 may include a so-called chipset 110. A chipset refers to a group of integrated circuits, or chips, that are designed to work together. Chipsets are usually marketed as a single product (e.g., consider chipsets marketed under the brands INTEL®, AMD®, etc.).

In the example of FIG. 1, the chipset 110 has a particular architecture, which may vary to some extent depending on brand or manufacturer. The architecture of the chipset 110 includes a core and memory control group 120 and an I/O controller hub 150 that exchange information (e.g., data, signals, commands, etc.) via, for example, a direct management interface or direct media interface (DMI) 142 or a link controller 144. In the example of FIG. 1, the DMI 142 is a chip-to-chip interface (sometimes referred to as being a link between a "northbridge" and a "southbridge").

The core and memory control group 120 include one or more processors 122 (e.g., single core or multi-core, etc.) and a memory controller hub 126 that exchange information via a front side bus (FSB) 124. As described herein, various components of the core and memory control group 120 may be integrated onto a single processor die, for example, to make a chip that supplants the "northbridge" style architecture.

The memory controller hub 126 interfaces with memory 140. For example, the memory controller hub 126 may provide support for DDR SDRAM memory (e.g., DDR, DDR2, DDR3, etc.). In general, the memory 140 is a type of random-access memory (RAM). It is often referred to as "system memory."

The memory controller hub 126 can further include a low-voltage differential signaling interface (LVDS) 132. The LVDS 132 may be a so-called LVDS Display Interface (LDI) for support of a display device 192 (e.g., a CRT, a flat panel, a projector, a touch-enabled light emitting diode display or other video display, etc.). A block 138 includes some examples of technologies that may be supported via the LVDS interface 132 (e.g., serial digital video, HDMI/DVI, display port). The memory controller hub 126 also includes one or more PCI-express interfaces (PCI-E) 134, for example, for support of discrete graphics 136. Discrete graphics using a PCI-E interface has become an alternative approach to an accelerated graphics port (AGP). For example, the memory controller hub 126 may include a 16-lane (×16) PCI-E port for an external PCI-E-based graphics card (including, e.g., one of more GPUs). An example system may include AGP or PCI-E for support of graphics.

In examples in which it is used, the I/O hub controller 150 can include a variety of interfaces. The example of FIG. 1 includes a SATA interface 151, one or more PCI-E interfaces 152 (optionally one or more legacy PCI interfaces), one or more USB interfaces 153, a LAN interface 154 (more generally a network interface for communication over at least one network such as the Internet, a WAN, a LAN, etc. under direction of the processor(s) 122), a general purpose I/O interface (GPIO) 155, a low-pin count (LPC) interface 170, a power management interface 161, a clock generator interface 162, an audio interface 163 (e.g., for speakers 194 to output audio), a total cost of operation (TCO) interface 164, a system management bus interface (e.g., a multi-master serial computer bus interface) 165, and a serial peripheral flash memory/controller interface (SPI Flash) 166, which, in the example of FIG. 1, includes BIOS 168 and boot code 190. With respect to network connections, the I/O hub controller 150 may include integrated gigabit Ethernet controller lines multiplexed with a PCI-E interface port. Other network features may operate independent of a PCI-E interface.

The interfaces of the I/O hub controller 150 may provide for communication with various devices, networks, etc. For example, where used, the SATA interface 151 provides for reading, writing or reading and writing information on one or more drives 180 such as HDDs, SDDs or a combination thereof, but in any case the drives 180 are understood to be, e.g., tangible computer readable storage mediums that are not transitory, propagating signals. The I/O hub controller 150 may also include an advanced host controller interface (AHCI) to support one or more drives 180. The PCI-E interface 152 allows for wireless connections 182 to devices, networks, etc. The USB interface 153 provides for input devices 184 such as keyboards (KB), mice and various other devices (e.g., cameras, phones, storage, media players, etc.).

In the example of FIG. 1, the LPC interface 170 provides for use of one or more ASICs 171, a trusted platform module (TPM) 172, a super I/O 173, a firmware hub 174, BIOS support 175 as well as various types of memory 176 such as ROM 177, Flash 178, and non-volatile RAM (NVRAM) 179. With respect to the TPM 172, this module may be in the form of a chip that can be used to authenticate software and hardware devices. For example, a TPM may be capable of performing platform authentication and may be used to verify that a system seeking access is the expected system.

The system 100, upon power on, may be configured to execute boot code 190 for the BIOS 168, as stored within the SPI Flash 166, and thereafter processes data under the control of one or more operating systems and application software (e.g., stored in system memory 140). An operating system may be stored in any of a variety of locations and accessed, for example, according to instructions of the BIOS 168.

The system 100 may also include an audio receiver/microphone 191 that provides input from the microphone 191 to the processor 122 based on audio that is detected, such as via a user providing audible input to the microphone as part of a video conference consistent with present principles. In some examples, the microphone 191 may be established by an array of plural microphones.

Additionally, note that the system 100 may include a camera 193 that gathers one or more images and provides input related thereto to the processor 122, such as providing images of a user to the processor 122 as the user participates in a video conference consistent with present principles. The camera 193 may be a thermal imaging camera, an infrared (IR) camera, a digital camera such as a webcam, a three-dimensional (3D) camera, and/or a camera otherwise integrated into the system 100 and controllable by the processor 122 to gather pictures/images and/or video.

Still further, though not shown for simplicity, in some embodiments the system 100 may include a gyroscope that senses and/or measures the orientation of the system 100 and provides input related thereto to the processor 122, as well as an accelerometer that senses acceleration and/or movement of the system 100 and provides input related thereto to the processor 122. Also, the system 100 may include a GPS transceiver that is configured to communicate with at least one satellite to receive/identify geographic position information and provide the geographic position information to the processor 122. However, it is to be understood that another suitable position receiver other than a GPS receiver may be used in accordance with present principles to determine the location of the system 100.

It is to be understood that an example client device or other machine/computer may include fewer or more features than shown on the system 100 of FIG. 1. In any case, it is to be understood at least based on the foregoing that the system 100 is configured to undertake present principles.

Figure 2:
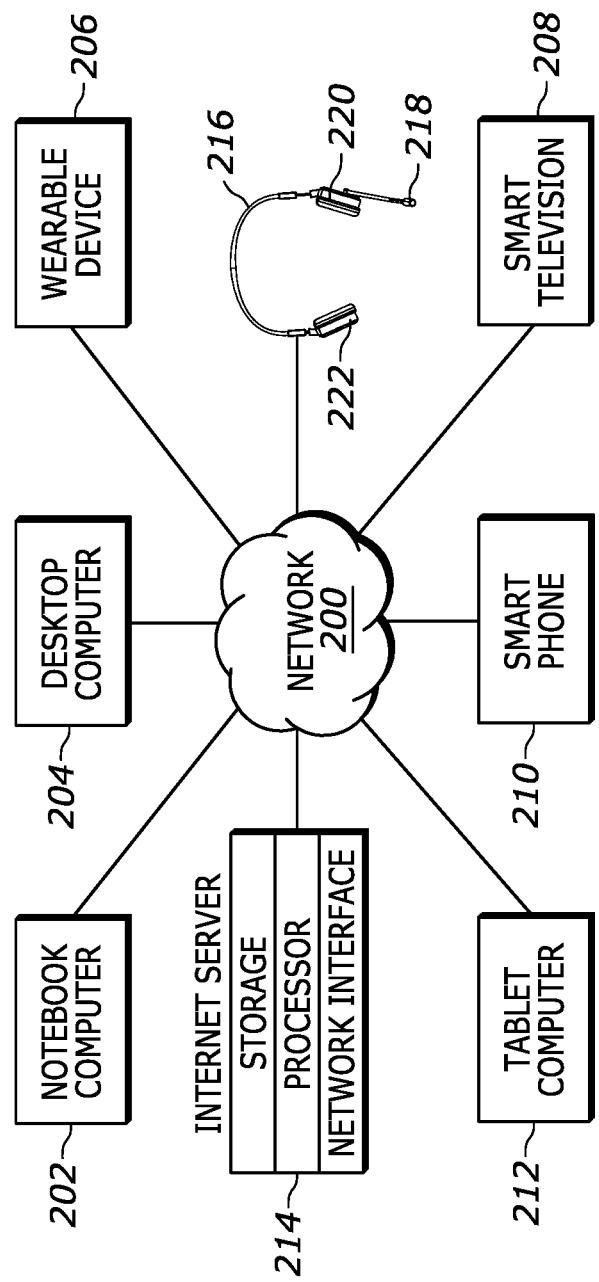
FIG. 2 is a block diagram of an example network of devices consistent with present principles.

Turning now to FIG. 2, example devices are shown communicating over a network 200 such as the Internet in accordance with present principles. It is to be understood that each of the devices described in reference to FIG. 2 may include at least some of the features, components, and/or elements of the system 100 described above. Indeed, any of the devices disclosed herein may include at least some of the features, components, and/or elements of the system 100 described above.

FIG. 2 shows a notebook computer and/or convertible computer 202, a desktop computer 204, a wearable device 206 such as a smart watch, a smart television (TV) 208, a smart phone 210, a tablet computer 212, a headset 216, and a server 214 such as an Internet server that may provide cloud storage accessible to the devices 202-212, 216. It is to be understood that the devices 202-216 are configured to communicate with each other over the network 200 to undertake present principles.

Describing the headset 216 in more detail, it may be a Bluetooth headset configured for communicating wirelessly with another end-user computing device such as the notebook computer 202 or desktop computer 204 for a user to engage in video conferencing. For example, a camera may be located on either of the notebook computer 202 or desktop computer 204 for imaging the user while the headset 216 may communicate with the computer 202 or 204 using wireless Bluetooth communication to provide spoken input from the user as detected at a headset microphone 218 to the computer 202 or 204. The computer 202 or 204 may then transmit both video data of the user from its camera and audio data of the user from the microphone 218 over the Internet to the respective devices of other conference participants that are located at different geographical locations (e.g., different cities, states, countries, etc.). In some examples, the audio and video data may be routed through the server 214 from the computer 202 or 204 before being received by the respective devices of other conference participants.

As also shown in FIG. 2, the headset 216 may include a left ear speaker 220 and a right ear speaker 222 for placement proximate to respective left and right ears of the user when the headset 216 is worn. The speakers 220, 222 may be used for presenting audio from the other respective conference participants during video conferencing while video for the other respective conference participants may be presented on the display of the computer 202 or 204 itself. Still further, note that rather than using the computer 202 or 204, the foregoing may apply to operation of the headset 216 for video conferencing in conjunction with other device types as well, such as the wearable device 206, smart television 208, smart phone 210, or tablet computer 212 also shown in FIG. 2.

Figure 3:
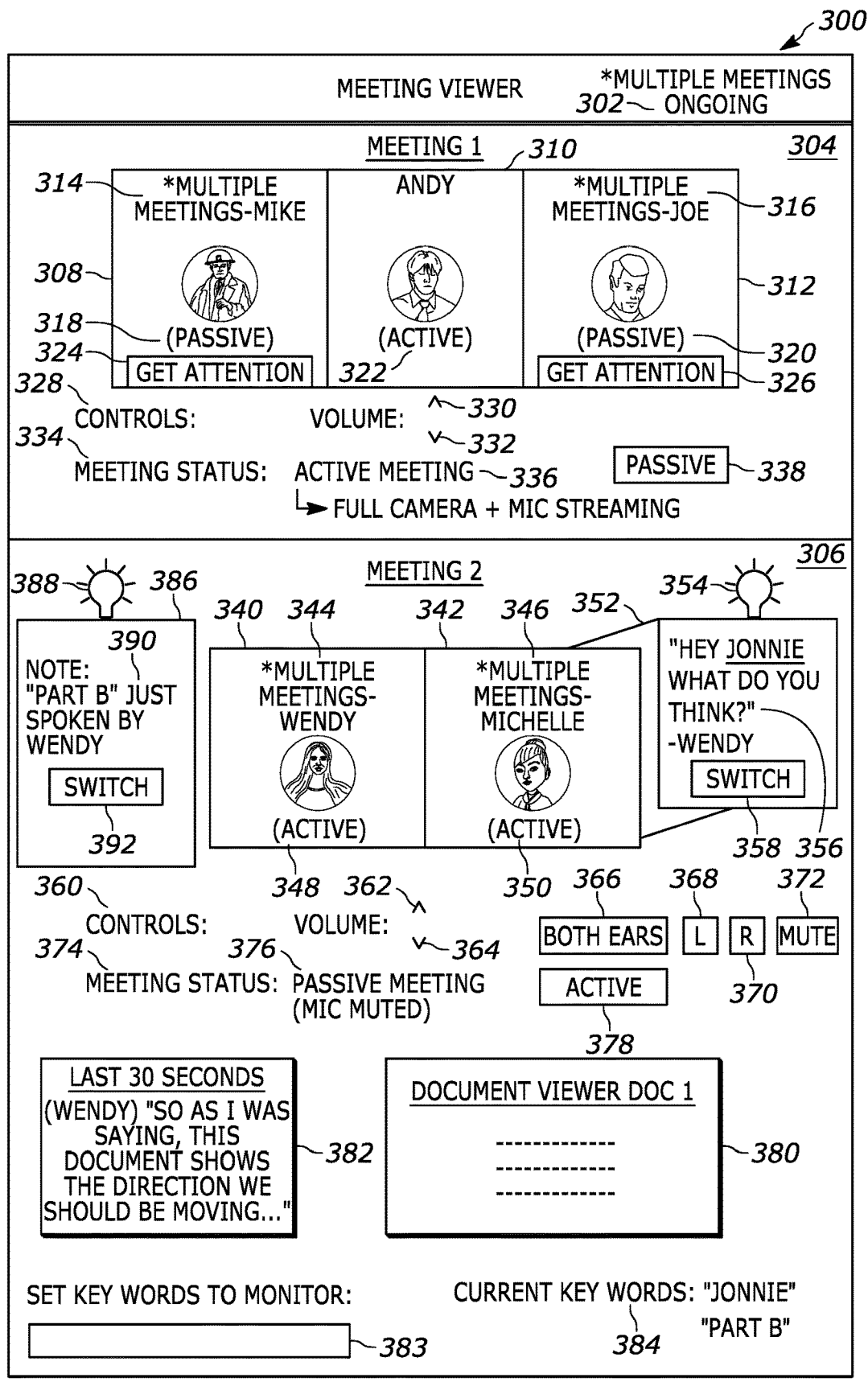
FIG. 3 shows an example graphical user interface (GUI) that may be presented on the display of a device while more than one video conference is currently ongoing consistent with present principles.

Now describing FIG. 3, it shows an example graphical user interface (GUI) presentable on the touch-enabled display of an end user's device for facilitating participation in multiple video conferences simultaneously. As shown, the GUI 300 may be named a meeting viewer and include an indication 302 that plural video conferences are currently ongoing and being facilitated by the device. As also shown, the GUI 300 may include a first section 304 for presentation of visual information related to a first video conference (titled "Meeting 1") and a second section 306 for presentation of visual information related to a second video conference (titled "Meeting 2").

As shown in the section 304, respective video feeds 308, 310, and 312 are presented, with each feed presenting streaming video of at least the faces of remotely-located conference participants of the first video conference in real time as the portions of the feed are received by the device. Overlaid on each video feed may be additional data. For example, the name of the respective participant may be presented as shown. Also, for each remote participant that is himself or herself engaging in plural video conferences, respective indications 314 and 316 may be presented indicating as much. Additionally or alternatively, whether the first video conference is actively or passively being participated in by the other participants may also be indicated by respective passive indications 318, 320 and active indications 322 that are overlaid on the respective video feeds.

Passively participating in a meeting may include the respective participant's device not providing audio detected at its respective microphone to other participants of the same conference and/or not presenting audio of other participants speaking in the same video conference at the respective participant's device. Conversely, actively participating in a meeting may include the respective participant's device both providing audio detected at its respective microphone to other participants of the same conference and also presenting audio of other participants at the respective participant's device. Whether a respective participant device and hence respective participant is actively or passively participating in a given video conference may be indicated to other participants in metadata for the video conference that is streamed to the other devices based on whatever settings the respective participant might have configured for the conference as will be set forth further below.

As also shown, overlaid on the respective video feeds for passive participants may be respective selectors 324, 326 that are respectively selectable to transmit a command to the device of the respective participant shown in the respective video feed to present a notification at the other participant's device indicating that his or her attention is requested for the associated video conference (Meeting 1 in this example). The notification itself may be a pop-up box presented on the display of the other participant's device to direct his or her attention to the first video conference. An example of this type of pop-up box will be described further below.

Also shown for the first video conference is a control section 328 where controls related to presentation of audio and video data for the first video conference may be presented. For example, an up volume control 330 and a down volume control 332 may be presented to respectively adjust the volume level of audio up or down for the first video conference. The audio for the first conference itself may include audio of the other conference participants speaking as part of the first conference.

Even further, a meeting status section 334 may be presented for the first video conference. The meeting status section may include an indication 336 regarding whether the first video conference is being actively or passively participated in by the user associated with the device presenting the GUI 300 on its display. In some examples the indication 336 may further include text as shown that indicates a status of streaming audio video data from the user's device to the devices of other participants. In this example, the text indicates that both camera and microphone input from the user's device is being transmitted to the devices of the other participants as part of the first video conference.

As also shown on the GUI 300 for the first video conference, a selector 338 may be presented. The selector 338 may be selectable a single time (e.g., using touch or cursor input) to switch the first video conference to being passively participated in at the user's device and the second video conference to being actively participated in at the user's device. Thus, for example, selection of the selector 338 may command the device to stop transmitting audible input spoken by the user and detected by the device's microphone to the devices of the other conference participants as part of the first video conference while enabling the transmission of audible input to devices of other conference participants as part of the second video conference. Selection of the selector 338 may also command the device to switch from presenting audio of other conference participants for the first video conference a greater volume level at the user's device than audio for the second video conference to presenting audio of other conference participants for the second video conference at a greater volume level than audio for the first video conference.

Thus, it is to be more generally understood that audio of the video conference for whatever conference is active may be presented at a greater volume level than audio for one or more passive conferences that might be concurrently participated in by the user. Thus, in some examples audio for the passive conference(s) may not be presented at a volume level greater than zero (e.g., no audio presented at all or the speakers being muted via a software mute). In other examples, audio for the passive conference(s) may be presented at a volume level greater than zero (e.g., volume level three) but still less than the volume level at which audio for the active conference is being presented (e.g., volume level eight). In still other examples, a combination of the foregoing may be used where at least two passive conferences are being facilitated and the user may configure one passive conference to decline to present audio at a level greater than zero but still configure another passive conference to present audio at a level greater than zero but still less than the level at which audio for the active conference is being concurrently presented.

In addition to or in lieu the foregoing regarding use of lesser volume levels for passive conferences, in certain examples where plural speakers are being used by the user's device to present audio for various conferences, only one speaker may be used to present audio of passive conferences while both or multiple speakers may be used to present audio for the active conference. For example, should the headset 216 described above be used by the user to hear audio from various video conferences, only one of the left ear speaker and the right ear speaker may be controlled to present audio of one or more passive video conferences while both speakers may be controlled to present audio of the active conference. The user may even select which of the left ear speaker or right ear speaker should be used for presenting audio of passive conferences.

Now discussing the section 306 of FIG. 3 in relation to the second video conference that is currently ongoing at the same time as the first video conference, respective video feeds 340, 342 may be presented with each feed presenting video of at least the respective face of a respective remotely-located conference participant of the second video conference. Each video feed may be streamed and then presented in real time as additional portions of the feed are received by the device.

As also shown, overlaid on each video feed for the second video conference may be additional data. For example, the name of the respective participant may be presented as shown. Also, for each remotely-located participant that is himself or herself engaging in plural video conferences, respective indications 344 and 346 may be presented indicating as much. Additionally or alternatively, whether the second video conference is actively or passively being participated in by the other participants may also be indicated by respective active indications 348, 350 that are overlaid on the respective video feeds.

Additionally, note that although the other two participants for the second video conference (Wendy and Michelle) are actively participating in the second video conference, should they go to passively participating in the second video conference at their own respective devices then data indicating as much may be transmitted to the device presenting the GUI 300. In response, the device may overlay selectors similar to the selectors 324, 326 on the respective video feeds as presented on the GUI 300 for selection according to the description above. Likewise, responsive to determining that Wendy and Michelle have switched to passive participation, the device may change the indications 348, 350 to indications indicating passive participation similar to the indications 318, 320 described above.

Further describing selectors like the selectors 324, 326, assume for a moment that the user of the device presenting the GUI 300 (Jonnie) is passively participating in the second video conference owing to actively participating in the first video conference. Second video conference participant Wendy's device may be presenting a GUI similar to the GUI 300 and Wendy may have selected a selector from that GUI that is akin to the selectors 324, 326 to draw Jonnie's attention to the second video conference. Responsive to selection of this selector from Wendy's device, Wendy's device may transmit a request for Jonnie's attention to Jonnie's device. In response, Jonnie's device may present the pop-up box 352 shown on the GUI 300 for a threshold non-zero amount of time (e.g., ten seconds) before removing it from the GUI 300.

As shown, the pop-up box 352 may be accompanied by an icon such as an illuminated light bulb 354 and indicate either predetermined default text or specific text 356 provided by Wendy. The text 356 may ask Jonnie what he thinks about an issue being discussed in the second video conference and identify the person who initiated the request (Wendy in this case). The box 352 may even include a selector 358 that may be selectable to switch Jonnie's active participation from the first video conference to the second video conference so that microphone input of Jonnie speaking may be transmitted to the second video conference participants and so that audio for the second video conference may be presented at Jonnie's device at a greater volume level than audio for the first video conference.

As also shown for the section 306, a control section 360 for the second video conference may also be presented on the GUI 300. The control section 360 may include, for example, an up volume control 362 and a down volume control 364 that may be selectable to respectively adjust the volume level of audio up or down for the second video conference. Further, assuming the second video conference is still being passively participated in at the device presenting the GUI 300 (Jonnie's device), one or more selectors 366, 368, 370, and 372 may be presented.

The selector 366 may be selected to command the device to present audio for the second video conference to both of Jonnie's ears using left and right ear speakers of a headset worn by Jonnie that is in communication with the device, albeit at a lower volume level than audio for the first video conference is being presented also using the headset. However, selector 368 may also be selected to instead present the lower-volume audio for the second video conference using the headset's left ear speaker alone while selector 370 may be selected instead to present the lower-volume audio for the second video conference using the headset's right ear speaker alone. The selector 372 may be selected to mute audio for the second video conference so that it is not presented at all at either of the headset or device presenting the GUI 300 (rather than presenting it at a lower volume level than the first video conference but that is still more than zero/mute).

Still further, for the section 306 a meeting status section 374 may be presented for the second video conference. The meeting status section may include an indication 376 that the second video conference is being passively participated in and may even include text as shown that indicates a status of streaming audio video data from the user's device to the devices of other participants. In this example, the text indicates that microphone input from Jonnie's device is not being transmitted to the devices of the other participants of the second video conference as part of the second video conference.

As also shown on the GUI 300 for the second video conference, a selector 378 may be presented. The selector 378 may be selectable a single time to switch the second video conference to being actively participated in at Jonnie's device and the first video conference being passively participated in. Thus, for example, selection of the selector 378 may command the device to stop transmitting audible input spoken by the user (Jonnie) and detected by his device's microphone to the other devices of the other conference participants as part of the first video conference and to enable the transmission of audible input to other devices of other conference participants as part of the second video conference. Selection of the selector 378 may also command the device to switch from presenting audio of other conference participants for the first video conference at a greater volume level at the user's device than audio for the second video conference to presenting audio of other conference participants for the second video conference at a greater volume level than audio for the first video conference.

Still describing the section 306, in some examples a document viewer window 380 may be presented. The document viewer window 380 may present one or more electronic documents that are being shared amongst participants of the second video conference during the conference itself. For example, the window 380 may present both a word processing document and a portable data file (PDF) document that are the subject of discussion during the second video conference.

Also if desired, in some examples the GUI 300 may include a transcript window 382 at which a most-recent threshold amount of words spoken by participants of the second video conference may be presented as text after transcription by speech to text software executing at one of the participants' devices or a server facilitating the second video conference. For example, a most-recent thirty seconds of audio may be presented in the window 382 as transcribed text. Thus, the text presented in the window 382 may update in real time as additional words are spoken and may even indicate the name of the participant that spoke respective portions of the words as also shown in FIG. 3. By presenting transcribed text in the window 382, the user (Jonnie) may be able to follow or catch up on what is being discussed in the second video conference during his passive participation. Note, however, that in some examples the window 382 (and document viewer 380 for that matter) may still be presented even if Jonnie were to switch to active participation in the second video conference to further aid him.

Also to provide an aid during passive conferencing (or even active conferencing), Jonnie may enter one or more keywords into keyword entry box 383. The device and/or server may then use speech to text software to monitor the audio stream for the second video conference and then notify Jonnie via the GUI 300 and/or a predetermined chime or tone if a keyword input to the box 382 is spoken during the second video conference. Also note that keywords 384 already specified by Jonnie may also be presented on the GUI 300.

Then, responsive to identifying one of the user-specified keywords being spoken, the GUI 300 may animate to present the pop-up box 386 as a notification of the keyword being spoken. The pop-up box 386 may be presented on the GUI 300 for a threshold non-zero amount of time (e.g., five seconds) before the device removes it from the GUI 300.

When presented, the pop-up box 386 may be accompanied by an icon such as an illuminated light bulb 388 and indicate via text 390 that a user-defined keyword has been spoken during the second video conference. The box 386 may even include a selector 392 that may be selectable to switch Jonnie's active participation from the first video conference to the second video conference so that microphone input of Jonnie speaking may be transmitted to the other devices of the other second video conference participants and so that audio for the second video conference may be presented at Jonnie's device at a greater volume level than audio for the first video conference is presented consistent with present principles.

Figure 4:
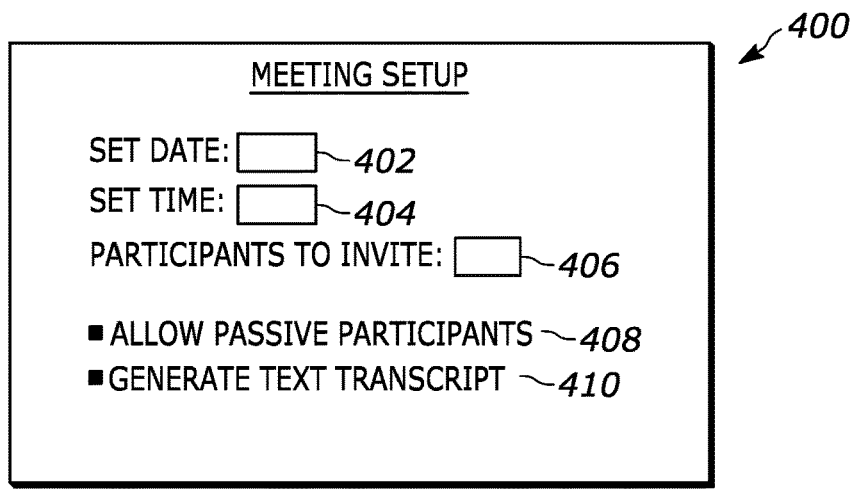
FIG. 4 shows an example GUI that may be used for creating a video conference consistent with present principles.

Before moving on to the description of FIG. 4, it is to be further understood that should a user switch from actively participating in one video conference to actively participating in another video conference as disclosed herein, a GUI like the GUI 300 may dynamically switch its visual elements (e.g., sections 304, 306) to reflect that switch for each conference.

Now in reference to FIG. 4, it shows an example GUI 400 that may be presented on the touch-enabled display of a device for a video conference creator or organizer person to initially set up a video conference consistent with present principles. As shown, the GUI 400 may include a box 402 at which a video conference date may be entered, a box 404 at which a video conference time may be entered, and a box 406 at which video conference participants may be entered for the device to then send those participants electronic invitations (e.g., email invitations) to join the video conference.

As also shown, the GUI 400 may include an option 408 that may be selected via the adjacent check box to configure the video conference to allow for passive participants consistent with present principles, as might be managed by a server that will facilitate the conference among the participants. The option 408 thus gives the conference creator the choice of allowing passive participation in which microphone input from a given person might not be presented as part of the video conference if that person is also participating in another conference at the same time.

In some examples, the GUI 400 may also include an option 410 that may be selected via the adjacent check box to configure one or more of the end-user devices for the video conference and/or the server that is facilitating it to use speech recognition/speech to text software to generate a text transcript of what is spoken during the video conference being created. The text transcript may then be presented at one or more end-user devices for conference participants consistent with present principles (e.g., presented on the GUI 300 as described above).

Figure 5:
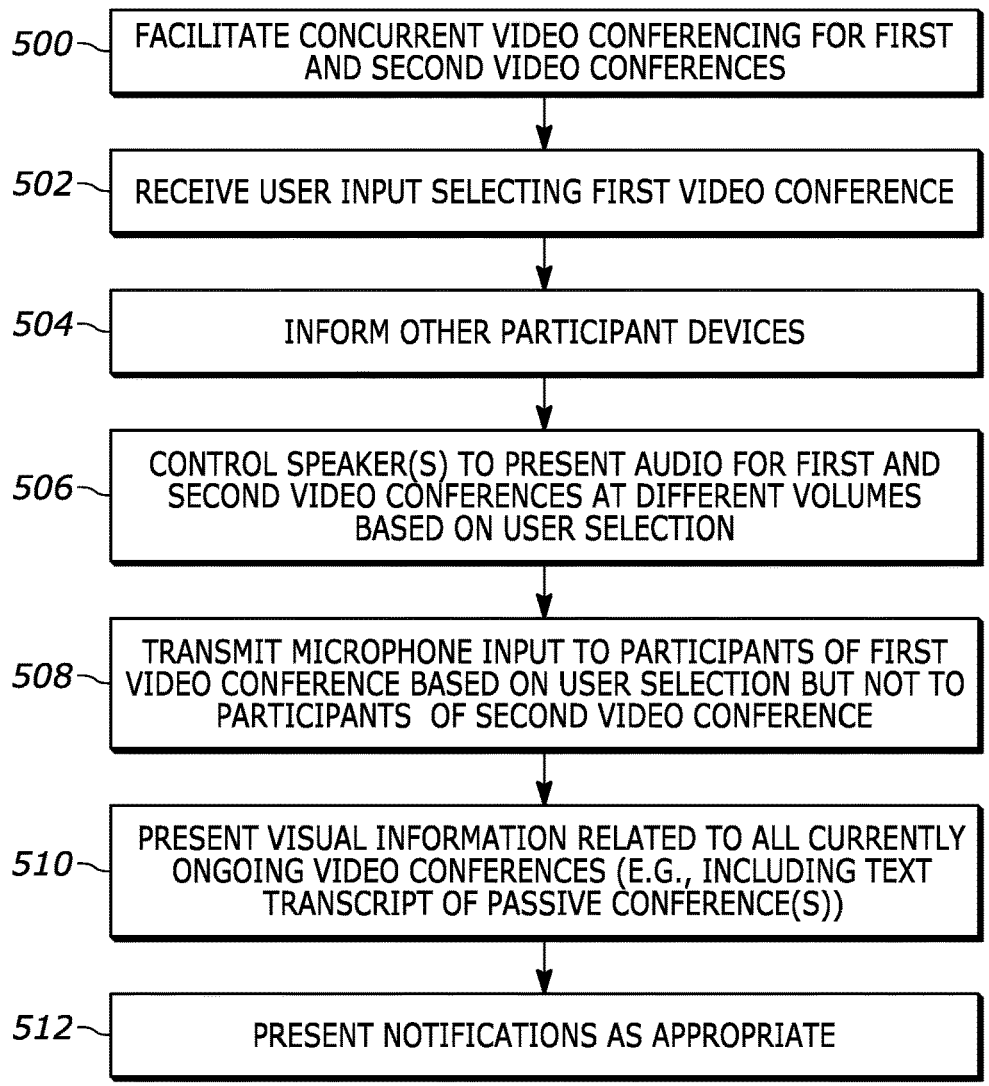
FIG. 5 shows a flow chart of an example algorithm consistent with present principles.

Referring now to FIG. 5, it shows example logic that may be executed by a device such as the system 100 and/or device presenting the GUI 300 consistent with present principles. Beginning at block 500, the device may facilitate concurrent video conferencing for first and second video conferences, e.g., based on communication with a server coordinating the conference and/or based on communication with other end-user devices of other conference participants. From block 500 the logic may then proceed to block 502.

At block 502 the device may receive user input selecting the first video conference for active participation and then, at block 504, transmit electronic indications/notifications to the devices of other conference participants for both the first and second video conferences. For example, indications may be transmitted to participants of the first video conference indicating that the user is actively participating in the first video conference while indications may be transmitted to participants of the second video conference indicating that the user is passively participating in the second video conference.

From block 504 the logic may then proceed to block 506. At block 506 the device may control one or more speakers in communication with the device to present audio for the first and second video conferences as they occur concurrently. The speakers may be controlled based on user configuration for volume levels for the respective conferences and/or according to default settings. Thus, the first video conference may be presented at a greater volume level than audio for the second video conference such that the audio for the second video conference may be presented at a volume level greater than zero but still not as loud as audio for the first video conference. Or, audio for the second video conference may not be presented at all via the speakers of the device so long as the first video conference remains the one actively participated in.

From block 506 the logic may then proceed to block 508. At block 508 the device may transmit, to other participants of the first video conference, microphone input of the user speaking as detected at the device's microphone based on the user selecting the first video conference for active participation. Also based on that same, single user selection, at block 508 the device may decline to transmit microphone input to other participants of the second video conference that is being passively participated in.

Thereafter the logic may proceed to block 510. At block 510 the device may present visual information related to all currently-ongoing video conferences. For example, the GUI 300 may be presented at block 510 while plural video conferences are concurrently ongoing. Thus, for example, a text transcript of the second video conference may be presented at block 510 as well as a selector to switch to active participation in the second video conference.

From block 510 the logic may then proceed to block 512. At block 512 the device may present notifications as appropriate as the conferences continue to occur simultaneously. For example, the notifications 352 or 386 may be presented at the appropriate time on the GUI 300 according to the description above.

Figure 6:
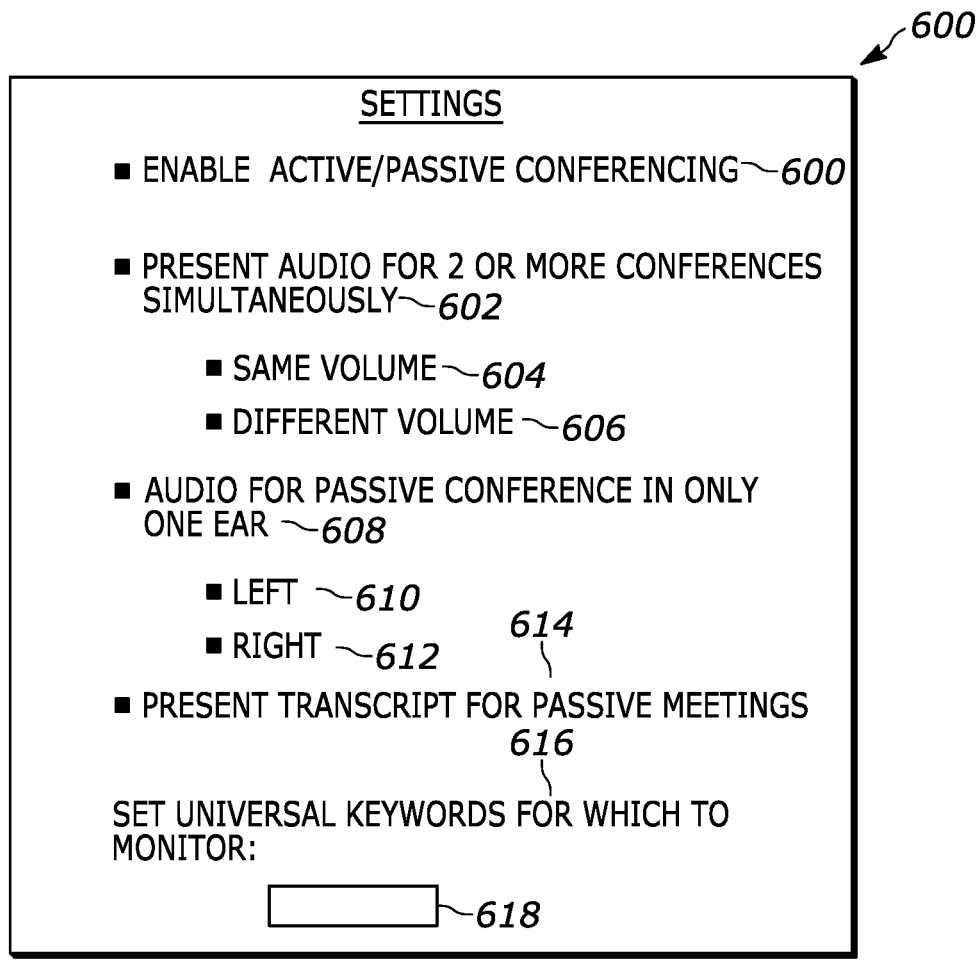
FIG. 6 shows an example GUI for configuring one or more settings of a device consistent with present principles.

Now describing FIG. 6, it shows an example GUI 600 that may be presented on the display of a device for configuring one or more settings of the device to undertake present principles related to video conferencing. Each of the options or sub-options to be discussed below may be selected based on selection of the respective check box shown adjacent thereto.

As shown, the GUI 600 may include a first option 602 that may be selectable to enable active and passive video conferencing. For example, the first option 602 may be selected to configure the device to undertake the functions described above in reference to FIG. 3 and/or to undertake the logic described above in reference to FIG. 5.

The GUI 600 may also include an option 602 that may be selected to configure the device to present audio for two or more video conference simultaneously rather than, e.g., only presenting audio for an actively participated-in conference and not presenting audio for a passively participated-in conference. Sub-option 604 may be selected to configure the device to present audio for both active and passive conferences at a same volume level by default, while sub-option 606 may be selected to configure the device to present audio for both active and passive conferences at different volume levels that are both greater than zero by default.

Still further, in some examples the GUI 600 may include an option 608 that may be selected to configure the device to, by default, present audio for passive video conferences in only one ear speaker of a headset having both left and right ear speakers. Sub-option 610 may thus be selected to select the left ear speaker while sub-option 612 may be selected to select the right ear speaker.

If desired, the GUI 600 may also include an option 614 that may be selected to configure the device to, by default, present text transcripts for one or more passive video conferences that are being participated in.

Still further, in some examples a setting 616 may be presented as part of the GUI for entering one or more keywords for which the device and/or a server in communication with the device is to, by default, monitor by default for presentation of notifications such as the notification 386 described above. Thus, one or more keywords or phrases may be entered to input box 618 for such purposes. Note that keywords may be defined via box 618 not just for a single conference but possibly for all future conferences that might be passively participated in.

It may now be appreciated that present principles provide for an improved computer-based user interface that improves the functionality and ease of use of the devices disclosed herein. The disclosed concepts are rooted in computer technology for computers to carry out their functions.

It is to be understood that whilst present principals have been described with reference to some example embodiments, these are not intended to be limiting, and that various alternative arrangements may be used to implement the subject matter claimed herein. Components included in one embodiment can be used in other embodiments in any appropriate combination. For example, any of the various components described herein and/or depicted in the Figures may be combined, interchanged or excluded from other embodiments.

What is claimed is:

1. A first device, comprising:
   at least one processor;
   at least one microphone accessible to the at least one processor;
   at least one speaker accessible to the at least one processor;
   at least one display accessible to the at least one processor; and
   storage accessible to the at least one processor and comprising instructions executable by the at least one processor to:
   facilitate concurrent video conferencing for first and second video conferences, the first and second video conferences being different from each other;
   receive user input selecting the first video conference;
   based on the user input, control the at least one speaker to output audio for the first video conference at a greater volume level than audio for the second video conference;
   based on the user input, transmit input from the at least one microphone to a second device associated with a participant of the first video conference but not to a third device associated with a participant of the second video conference; and
   concurrently present visual information on the at least one display related to both the first and second conferences while controlling the at least one speaker to output the audio for the first video conference at the greater volume level and while transmitting the input from the at least one microphone to the second device but not to the third device.

2. The first device of claim 1, wherein the visual information comprises one or more of: one or more video feeds of other participants of the first and second video conferences, one or more electronic documents being shared between participants of the first and second video conferences.

3. The first device of claim 1, wherein the instructions are executable to:
   based on the user input, control the at least one speaker to output audio for the first video conference at a volume level greater than zero and decline to output audio for the second video conference at a volume level greater than zero.

4. The first device of claim 3, wherein the instructions are executable to:
   based on the user input, control the at least one speaker to output audio for the first video conference at a volume level greater than zero and present, on the at least one display, text determined from audio for the second video conference.

5. The first device of claim 1, wherein the instructions are executable to:
   based on the user input, control the at least one speaker to output audio for the first video conference at a first volume level greater than zero and output audio for the second video conference at a second volume level greater than zero but less than the first volume level.

6. The first device of claim 5, wherein the at least one speaker comprises at least first and second speakers, and wherein the instructions are executable to:
   based on the user input, control both the first and second speakers to output audio for the first video conference at the first volume level, and control one but not both of the first and second speakers to output audio for the second video conference at the second volume level.

7. The first device of claim 1, wherein the instructions are executable to:
   while controlling the at least one speaker to output audio for the first video conference at the greater volume level than audio for the second video conference, present a notification at the first device indicating that a predefined keyword has been spoken in the second video conference.

8. The first device of claim 7, wherein the keyword is defined by a participant of the second video conference prior to the keyword being spoken in the second video conference.

9. The first device of claim 7, wherein the instructions are executable to:
   present a selector on the display as part of the notification, the selector being selectable to switch to transmitting input from the at least one microphone to the third device associated with a participant of the second video conference but not to the second device associated with a participant of the first video conference.

10. The first device of claim 1, wherein the instructions are executable to:
    based on the user input, transmit an indication to the third device indicating that the at least one microphone is not being currently used to participate in the second video conference.

11. The first device of claim 1, wherein the instructions are executable to:
    present, on the display, an indication regarding whether the second device is currently streaming microphone input for presentation as part of the first video conference.

12. A method, comprising:
    concurrently presenting, at a first device, data related to first and second video conferences that are currently ongoing, the first and second video conferences being different from each other;
    receiving user input selecting the first video conference;
    based on the user input, controlling at least one speaker accessible to the first device to output audio for the first video conference at a first volume level;
    based on the user input, transmitting input from at least one microphone accessible to the first device to a second device associated with a participant of the first video conference but not to a third device associated with a participant of the second video conference;

based on the user input and concurrent with controlling the at least one speaker to output audio for the first video conference at the first volume level:
 declining to output audio for the second video conference at a second volume level that is more than zero; and
 presenting text on a display accessible to the first device, the text corresponding to spoken words identified from audio for the second video conference.

13. The method of claim 12, comprising:
 declining, at a first time, to output the audio for the second video conference at the second volume level based on the user input and concurrent with controlling the at least one speaker to output audio for the first video conference at the first volume level, and wherein the method further comprises:
 based on the user input and concurrent with controlling the at least one speaker to output audio for the first video conference at the first volume level but at a second time, controlling the at least one speaker to output audio for the second video conference at a second volume level that is more than zero but that is less than the first volume level.

14. The method of claim 12, wherein the at least one speaker comprises a left ear speaker and a right ear speaker, the left ear speaker being different from the right ear speaker, and wherein the method comprises:
 declining, at a first time, to output the audio for the second video conference at the second volume level based on the user input and concurrent with controlling the at least one speaker to output audio for the first video conference at the first volume level; and
 based on the user input and at a second time, controlling both the left ear and right ear speakers to output audio for the first video conference at the first volume level and controlling one but not both of the left ear and right ear speakers to output audio for the second video conference at the second volume level that is more than zero, the second volume level being less than the first volume level.

15. The method of claim 12, comprising:
 while controlling the at least one speaker to output audio for the first video conference, presenting a visual notification that indicates that a predefined keyword has been spoken in the second video conference.

16. The method of claim 12, wherein the method comprises:
 presenting a visual indication regarding whether the second device is currently streaming microphone input from the second device as part of the first video conference.

17. At least one computer readable storage medium (CRSM) that is not a transitory signal, the computer readable storage medium comprising instructions executable by at least one processor of a first device to:
 facilitate a first video conference with at least a second device; and
 while facilitating the first video conference with at least the second device, present at least one visual indication on a display accessible to the at least one processor, the at least one visual indication indicating whether the second device is currently one or more of: streaming microphone input to the first device as part of the first video conference, presenting audio at the second device as part of the first video conference but not streaming microphone input to the first device as part of the first video conference.

18. The CRSM of claim 17, wherein the instructions are executable to:
 based on user input received via the first device, transmit an indication to the second device indicating one or more of: that at least one microphone accessible to the at least one processor is not being currently used to provide audio for the first video conference to the second device, that at least one speaker accessible to the at least one processor is not being currently used to present audio at the first device for the first video conference.

19. The CRSM of claim 17, wherein the instructions are executable to:
 while facilitating the first video conference with at least the second device, present the at least one visual indication on the display, the at least one visual indication indicating whether the second device is currently streaming microphone input to the first device as part of the first video conference.

20. The CRSM of claim 17, wherein the instructions are executable to:
 while facilitating the first video conference with at least the second device, present the at least one visual indication on the display, the at least one visual indication indicating whether the second device is currently presenting audio at the second device as part of the first video conference but not streaming microphone input to the first device as part of the first video conference.

* * * * *